(12) United States Patent
Koster et al.

(10) Patent No.: US 8,572,397 B2
(45) Date of Patent: Oct. 29, 2013

(54) BIOMETRIC AUTHENTICATION AND IDENTIFICATION

(75) Inventors: Robert Paul Koster, Eindhoven (NL);
Antonius Hermanus Maria Akkermans, Eindhoven (NL);
Bartholomeus Johannes Van Rijnsoever, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 370 days.

(21) Appl. No.: 12/996,778

(22) PCT Filed: Jun. 17, 2009

(86) PCT No.: PCT/IB2009/052579
§ 371 (c)(1),
(2), (4) Date: Dec. 8, 2010

(87) PCT Pub. No.: WO2009/153742
PCT Pub. Date: Dec. 23, 2009

(65) Prior Publication Data
US 2011/0093942 A1     Apr. 21, 2011

(30) Foreign Application Priority Data
Jun. 20, 2008 (EP) ..................................... 08158651

(51) Int. Cl.
*H04L 29/06* (2006.01)

(52) U.S. Cl.
USPC .......................................................... 713/186

(58) Field of Classification Search
USPC .......................................................... 713/186
See application file for complete search history.

(56) References Cited

U.S. PATENT DOCUMENTS

| | | | | |
|---|---|---|---|---|
| 6,003,135 | A | * | 12/1999 | Bialick et al. ................... 726/29 |
| 6,088,802 | A | * | 7/2000 | Bialick et al. ...................... 726/3 |
| 2002/0112177 | A1 | * | 8/2002 | Voltmer et al. ............... 713/200 |

(Continued)

FOREIGN PATENT DOCUMENTS

WO     2005122467 A1     12/2005

OTHER PUBLICATIONS

Dass et al: "Validating a Biometric Authentication System: Sample Size Requirements";IEEE Transactions on Pattern Analysis and Machine Intelligence, Dec. 2006, vol. 28, No. 12, pp. 1902-1913.

(Continued)

*Primary Examiner* — Michael S McNally (57) ABSTRACT

Authentication of a user to an electronic device in a communication network is described. The method comprises obtaining a biometric characteristic of the user, transmitting, to a social networking service, information that specifies at least one primary user of the device, receiving, from the social networking service, information that specifies a group of persons who have a social relationship with the at least one primary user, obtaining information that specifies a result from a biometric matching operation with the biometric characteristic of the user and biometric characteristics of persons in the specified group of persons, the result indicating whether or not the user is authenticated to the electronic device. By narrowing down the size of the searching space-needed during a matching operation by utilizing information regarding a group of persons in a social network, the false acceptance rate is reduced and biometric authentication of a user to an electronic device is thereby facilitated, e.g. to access desired functionality of the device or access a desired service.

17 Claims, 3 Drawing Sheets

(56) References Cited

U.S. PATENT DOCUMENTS

| | | |
|---|---|---|
| 2004/0010697 A1* | 1/2004 | White .................. 713/186 |
| 2004/0010724 A1* | 1/2004 | Brown et al. ............ 713/202 |
| 2005/0180618 A1* | 8/2005 | Black .................. 382/124 |
| 2006/0174135 A1* | 8/2006 | Takaku et al. ........... 713/186 |
| 2008/0082667 A1 | 4/2008 | Meijer et al. |
| 2008/0148375 A1 | 6/2008 | Yamamoto et al. |
| 2008/0211627 A1* | 9/2008 | Shinzaki ............... 340/5.82 |

OTHER PUBLICATIONS

Patrick, A.: "Biometrics and Identity Theft"; Essay on Identity Theft, Downloaded From the Internet At www.andrewpatrick.ca/essays/biometrics-and-identity-theft/, on Apr. 18, 2008, 8 Page Document.

* cited by examiner

BIOMETRIC AUTHENTICATION AND IDENTIFICATION

TECHNICAL FIELD

The present invention relates to a method of improving biometric authentication and identification of users of network connected consumer electronic devices.

BACKGROUND

With respect to consumer electronic (CE) devices, there is a trend that these are becoming more and more network online service enabled. For example, modern gaming consoles support online services (e.g. Xbox Live). Furthermore, soon TVs will be equipped with functionality such as web-browsing functionality to access services. Typically, service enabled CE devices are complemented with a network portal that provides access to the actual services (such as e.g. the architecture presented in Open IPTV Forum, Functional Architecture—V 1.1, Jan. 15, 2008).

Typically, CE devices have limited user interaction means and users expect that the devices are convenient and simple to use, requiring few operations to accomplish a result. For example, users are typically reluctant to use complex repetitive login procedures using username/passwords.

With respect to digital identity, CE devices take a limited approach, for example to meet the convenience argument as discussed above. For example, the Nintendo Wii gaming console supports multiple characters ("Mii's") but these are not used for transactions or accessing services. For transactions, the owner of the device can link just one account per console that will be used for performing online transactions such as buying downloadable games. Use of this account can be protected using, e.g., a PIN.

Needless to say, CE devices such as gaming consoles are very often used by multiple people, i.e. not only the owner of a gaming console uses the console. However, up to now the online services are non-personalized, or at the most associated with a fixed single user (e.g. for transactions).

The use of biometric characteristics, biometrics, provides a very convenient way for replacing usernames, passwords and pin-codes in situations where authentication and identification are needed. The biometrics is unique for a human being and can not be forgotten, stolen or lost. As such they are a good candidate for being used in access control and e-transaction systems. In many of these systems biometrics is used to perform convenient and secure one-to-one authentication. However, despite the enormous improvement that has taken place during the past decade, the recognition performance of almost all biometric modalities is still not sufficient to make biometrics a reliable tool for large scale one-to-many identification purposes, and it is expected that this will be true for many years to come.

The state-of-the-art performance in terms of today's biometric systems is in the order of 1% equal error rate (EER). The EER is defined as the operating point of biometric systems at a false acceptance rate (FAR) that is equal to the false rejection rate (FRR). Generally, the EER is a useful performance measure, and the lower the value the better the system. By slightly tuning such a system to a somewhat higher FFR than 1%, a minimum FAR of 0.1% seems possible. Consequently, if the FAR for a given recognition system is 0.1%, this means that an imposter has 0.1% probability that his biometrics "looks like" that of a genuine person. It can be shown that if identification is to be performed, i.e. a one-to-many comparison, the probability that a person will by wrongly recognized becomes $FAR_{tot}=1-(1-FAR)^n$.

For example, if the FAR of a biometric recognition system is 0.1%, and a person is to be identified amongst a database of 30 persons, the probability $FAR_{tot}$ of finding the wrong person is $1-0.999^{30}=0.03$, which might acceptable. However, if a database of 300 has to be searched, the $FAR_{tot}$ becomes 26%, which makes this identification system essentially useless.

Additionally, as biometrics provides sensitive personal information about a human being, there is typically a privacy problem related to the storage and usage of biometric data. In order to solve this problem biometric data should never be stored in clear in a database but rather in an encrypted form to guarantee privacy and to avoid malicious database cross-matching attacks. By solving this problem the acceptance level of biometrics will be increased. Such privacy preserving techniques, often referred to as template protection systems, have been described in the prior art, for example in WO2005/122467.

SUMMARY

In order to improve on the prior art there is provided, according to a first aspect, a method of authenticating a user to an electronic device in a communication network. The method comprises obtaining a biometric characteristic of the user, transmitting, to a social networking service, information that specifies at least one primary user of the device, receiving, from the social networking service, information that specifies a group of persons who have a social relationship with the at least one primary user, obtaining information that specifies a result from a biometric matching operation with the biometric characteristic of the user and biometric characteristics of persons in the specified group of persons, the result indicating whether or not the user is authenticated to the electronic device.

In other words, by narrowing down the size of the searching space needed during a matching operation by utilizing information regarding a group of persons in a social network, the false acceptance rate is reduced and biometric authentication of a user to an electronic device is thereby facilitated, e.g. to access desired functionality of the device or access a desired service.

That is, regarding electronic devices such as CE devices, typically only a certain part of the complete population is likely to be relevant, in contrast to situations involving, e.g., online services, airport security systems etc. Guests and new users to an electronic device may be conveniently authenticated using their identity and biometric profile, without the need to enter information like their identifier and without the need to enroll their biometrics to the device.

Embodiments include those where the transmission of information that specifies at least one primary user of the device comprises transmission of at least one limiting parameter for limiting the number of persons in the specified group of persons.

The transmission of at least one limiting parameter may comprise transmission of a number that specifies the maximum number of persons in the specified group of persons.

Embodiments include those where the transmission of at least one limiting parameter comprises transmission of information that specifies types of relationships between the at least one primary user and persons in a social network of the user.

Embodiments include those where the transmission of at least one limiting parameter comprises transmission of information that specifies at least one characteristic parameter relating to the performance of the device in obtaining the biometric characteristic of the user.

The transmission of information that specifies at least one characteristic parameter relating to the performance of the device in obtaining the biometric characteristic of the user may comprise transmission of information related to any of a false acceptance rate and a false rejection rate.

Embodiments include those that also comprise transmission, to an identity provider, information of the specified group of persons, reception, from the identity provider, biometric characteristics of the persons in the specified group of persons, and wherein the obtaining of information that specifies a result from a biometric matching operation comprises performing the matching operation.

The reception, from the identity provider, of biometric characteristics of persons in the social network may comprises reception of secure biometric templates and helper data associated with the secure biometric templates, and wherein the matching operation may comprise utilizing the secure biometric templates and the helper data.

Embodiments include those that also comprise transmission, to an identity provider, information of the specified group of persons, and wherein the obtaining of information that specifies a result from a biometric matching operation comprises reception of information, from the identity provider, that specifies a result from a biometric matching operation with the biometric characteristic of the user and biometric characteristics of persons in the specified group of persons.

Such embodiments may also comprise reception, from the identity provider, helper data related to biometric templates that are associated with the persons in the specified group of persons, generation of biometric templates using the helper data and the biometric characteristic of the user, and transmission of the generated biometric templates to the identity provider.

Embodiments include those that comprise determining, depending on the obtained information of the result of the biometric matching, whether or not the user is authenticated to access a user desired service. That is, authentication of the user to use a service may be performed as a consequence of the user having been authenticated to the device.

In such embodiments, the transmission of at least one limiting parameter may comprise transmission of at least one limiting parameter that is obtained from a provider of the desired service.

According to a second aspect there is provided an electronic device comprising biometric input means, processing and communication circuitry that are configured to authenticating a user to the electronic device in a communication network. The circuitry is configured to obtain a biometric characteristic of the user, transmit, to a social networking service, information that specifies at least one primary user of the device, receive, from the social networking service, information that specifies a group of persons who have a social relationship with the at least one primary user, obtain information that specifies a result from a biometric matching operation with the biometric characteristic of the user and biometric characteristics of persons in the specified group of persons, the result indicating whether or not the user is authenticated to the electronic device.

According to a third aspect there is provided a computer program product comprising software instructions that, when executed in a processing unit, performs the method summarized above.

According to a fourth aspect, there is provided a method of enabling authentication of a user in a communication network. Such a method comprises receiving information that specifies at least one primary user, receiving a biometric characteristic of the user, obtaining information that specifies a group of persons who have a social relationship with the at least one primary user, performing a biometric matching operation with the biometric characteristic of the user and biometric characteristics of persons in the specified group of persons, the result indicating whether or not the user is authenticated.

Correspondingly, fifth and sixth aspects provide an apparatus and a computer program product that realize such a method.

BRIEF DESCRIPTION OF THE DRAWINGS

Embodiments will now be described with reference to the attached drawings, where.

DETAILED DESCRIPTION OF EMBODIMENTS

A social network specifies social relationships between users. This way, a social network of a user may specify his family, friends, colleagues, buddies to talk with, etc. From a technology perspective social networks are the representation of real social relationships in some kind of data structure or data format. Social networking services assist users to manage their social network(s) and use, disclose and share it for a range of purposes. The latter may be the case for the network in total, parts of it, or just specific aspects like certain types of relations, a subset of users, etc.

Social networks have become an increasingly popular concept with a number of different instantiations. Well known are social networking sites such as MySpace, Orkut, LinkedIn and FaceBook. These services allow users to publish part of their personal identity online including the relation to other users who, typically, also hold an account.

The social network of a user may also be used outside scope of a single service. For example, the OpenSocial Alliance enables this to certain extent. It defines a set of application programming interfaces (API) that allow developers to access the following core functions and information on participating social networks: profile information (user data), friends information (social graph) and activities (things that happen, news feed type stuff). Related competing social network API and specification activities are FaceBook API and OpenSocialWeb. OpenSocialWeb defines solutions for social network interoperability, e.g. through micro formats.

Social network information may be specified using the FOAF (friend of a friend) specification. FOAF entries can be used in a variety of context, including the embedded metadata of web pages. This way, the information may be available to, e.g., search engines and applications. Google Social Graph API is an experimental application that makes use of it together with other sources to determine and visualize social relationships between people.

Below will follow examples of how such social network services may be used in connection with biometric authentication.

Figure 1:
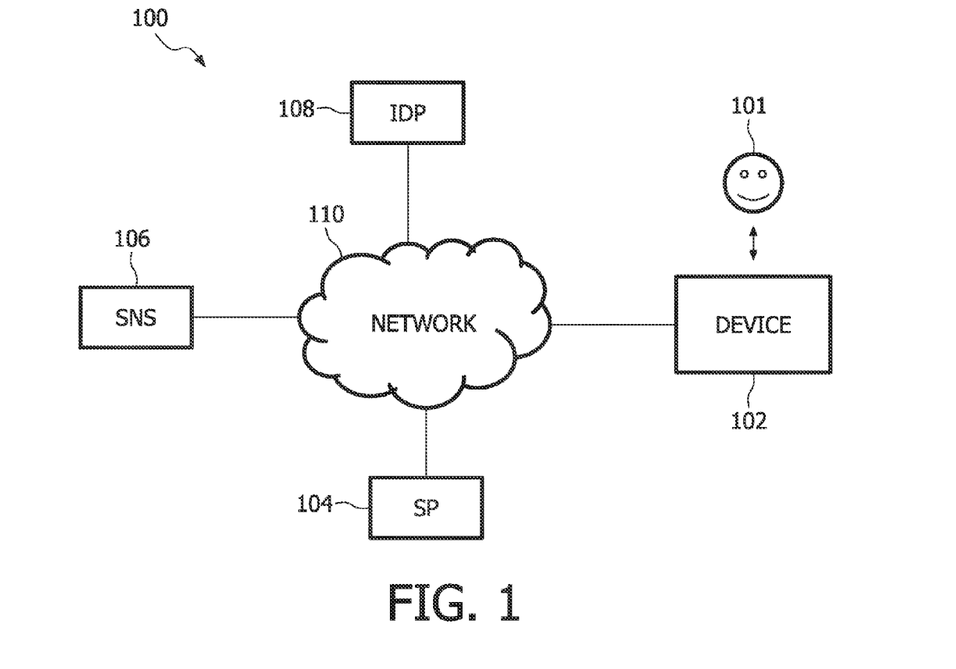
FIG. 1 schematically illustrates a block diagram of interacting entities connected to a communication network.

FIG. 1 illustrates schematically a system in which a method as summarized above may be realized. FIG. 1 depicts a distributed system comprising an electronic device 102, e.g. a consumer electronic device, CE device, such as a gaming console or TV-set, that is capable of interaction with a user 101.

The device 102 may have different kinds of users. One or more primary users associated to the device 102 typically use the device in a more or less regular basis. For this purpose, the device may hold some information about these primary users, e.g. an identifier and biometric characteristics, which it may have learned e.g. as part of some registration, enrollment or previous authentication step. Examples of primary users are the owner(s) of the device as well as other regular users, e.g. family members in the same household. In contrast to a primary user, a guest user is of another type of users that may make less regular or incidental use of the device 102. Typically, the device has no information about a guest user it has not encountered before.

Information is distributed over multiple parties: a service provider 104, a social network service 106 and an identity provider 108, all being realized in the form of one or more computer servers connected with and configured to communicate with each other via a communication network 110. Although FIG. 1 illustrates a distributed system, in a more basic form the service provider 104 may hold identity and social network data himself and thereby comprising the social network service 106 and the identity provider 108.

The service provider 104 is the party that provides one or more services to users, e.g. a user-generated video site or a photo sharing site. The service provider 104 maintains an account per user of the service, with associated profile in which is typically stored user-specific aspects of the service, e.g. published content. This account is linked to the account at the identity provider 108, who is also responsible for authentication of the user.

The social networking service 106 maintains, per user, the relation to other users. Optionally, also the type of relationship is maintained at the social networking service 106, such as family relationships "brother", "sister", "father", "mother" etc, or other relationships such as "colleague", "co-worker", "buddy", "friend" etc. Based on this information the social networking service 106 can determine a group of persons comprised in the social network of a user. The number of persons that can be determined is effectively up to an arbitrary size, e.g. friend of a friend of a friend up to a certain degree etc. It is also capable of determining whether or not two users have a relationship via mutual relations, etc.

Examples of existing social networking services include "MySpace", "FaceBook" and "LinkedIn". However, also other options are possible. For example, a dedicated service that determines relationships from other sources of information such as information that has been published on the web. Another example may be that a device portal builds its own social network like thing by e.g. considering specific devices, e.g. gaming consoles, that are used by multiple users, obtaining that information, and assuming a social relationship based on a share-a-device relationship. Yet another example is formed by Instant Messaging communication services that maintain a contact or "buddy" list for users.

The identity provider 108 is the party in the system 100 that maintains users' identity information, which may include login credentials and biometric profile. The identity provider 108 is responsible for authenticating a user such that a service provider, such as the service provider 104, can offer its services based on that authentication. The identity provider 108 may be an identity provider as known in the field of identity management, e.g. the Liberty Alliance architecture, OpenID, etc. Of course these are in such a case extended with functionality to support the method as summarized above.

The electronic device 102, e.g. a CE device in the form of a gaming console or TV-set, is configured such that it is capable of handling biometric authentication of users. For this purpose it is equipped with biometric sensors and logic to interpret and match biometric measurements. The electronic device 102 may locally keep, e.g. by means of a cache, information regarding users, e.g. associated primary users or other users known to the device. In this cache it may store some information about the user used by the device, a reference to the users' identity at the identity provider, and a copy of the biometric profile of the user.

Figure 2:
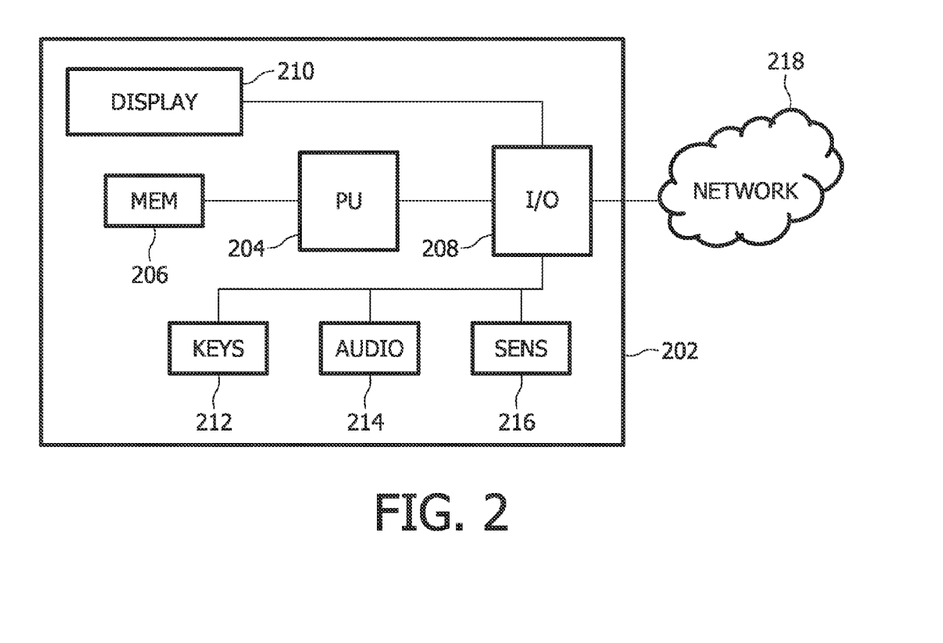
FIG. 2 illustrates schematically an electronic device.

FIG. 2 illustrates schematically an electronic device 202, such as the device 102 in FIG. 1. The device 202 may be a CE device, including such devices as a gaming console and a TV-set. A processing unit 204 is connected to a memory unit 206 that illustrates storage of data as well as software instructions that implements the method summarized above. The data that is stored in the memory 206 may include data, e.g. in the form of one or more biometric profiles of one or more primary users associated to the device 102. The processing unit 204 is connected, via an input/output interface unit 208, to a display 210, user input keys 212, an audio output unit 214 and a biometric sensing unit 216. Information on how these units operate and communicate with each other, including the biometric sensing unit 216 are known in the art and are hence not discussed in detail.

Figure 3:
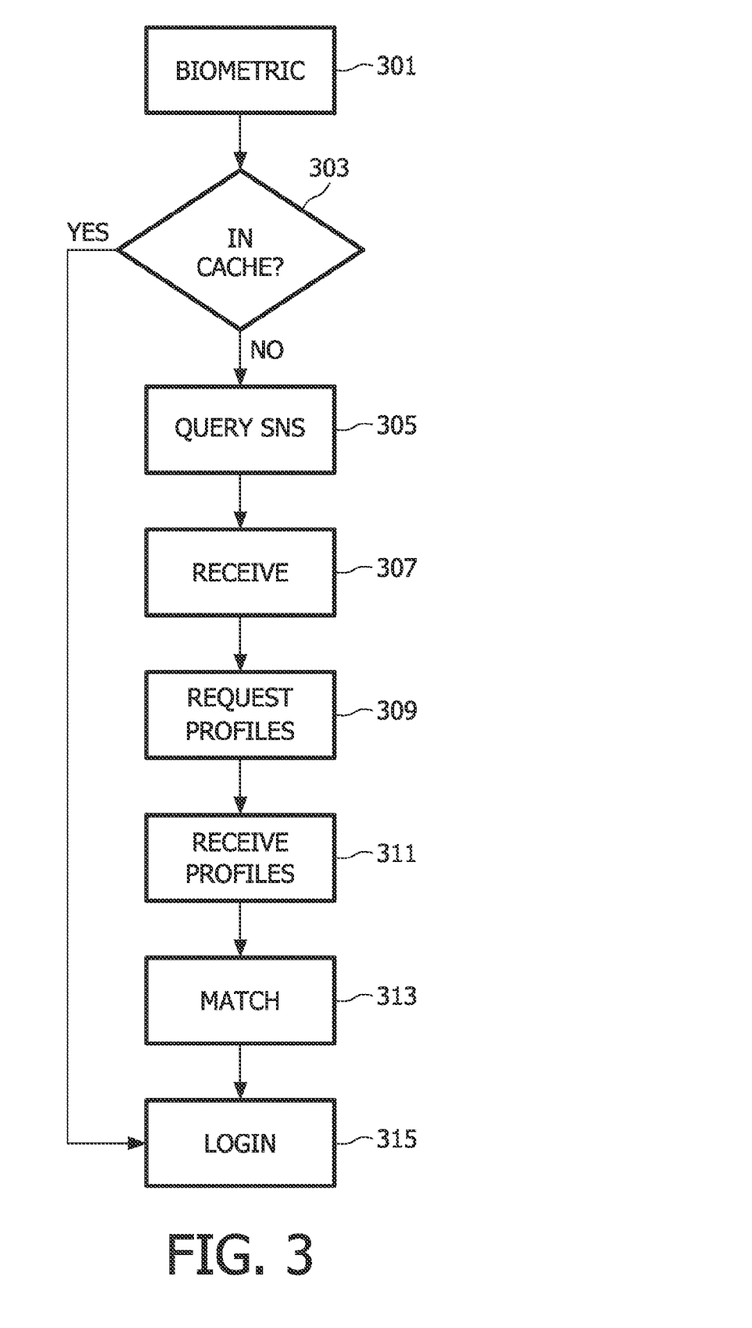
FIG. 3 is a flow chart of an authentication method.

Turning now to FIG. 3, a method of authenticating a user to use an electronic device in a communication network for accessing a user desired service at a service provider will be described by way of a flow chart. References will be made to an electronic device, a service provider, a social networking service and an identity provider that correspond to the respective entities 102, 104, 106 and 108 described above in connection with FIGS. 1 and 2.

In a biometric measurement step 301, the electronic device 102 takes a biometric measurement of the user. This measurement may be any biometric characteristic known in the art, including shape of face, finger print, iris, voice etc.

In a checking step 303, the device 102 attempts to match the biometric measurement against any biometric profiles stored in its local cache memory, e.g. profiles of the one or more primary users associated with the device 102. If this succeeds then the user is authenticated and the procedure continues with the login step 315.

If, in the checking step 303, it is found that the biometric measurement does not correspond to a profile already present locally in the device 102, the device sends a query to the social network service 106 for a group of persons in the social network of the one or more primary users associated to the device 102. A parameter of the query is information that specifies the one or more primary users. The query may also include one or more security parameters that may indicate a desired maximum size of the group of persons, i.e. the number of users to return to the electronic device 102.

The security parameters may be based on security policies defined by the service provider 104, on characteristics of the device 102, and on information that defines an inclusion strategy. The service provider 104 may require a certain level of security, e.g. a level corresponding to probability that an imposter is allowed to succeed in 1 out of 100 attempts. The device 102 may be equipped with a sensor and biometric algorithm, i.e. software code executed in a processing unit such as the processing unit 204 in FIG. 2, which has a false negative rate of 0.01%. This implies that the device 102 given its characteristics can match against a population of 100 users and meet the service provider's 104 requirement.

Figure 4:
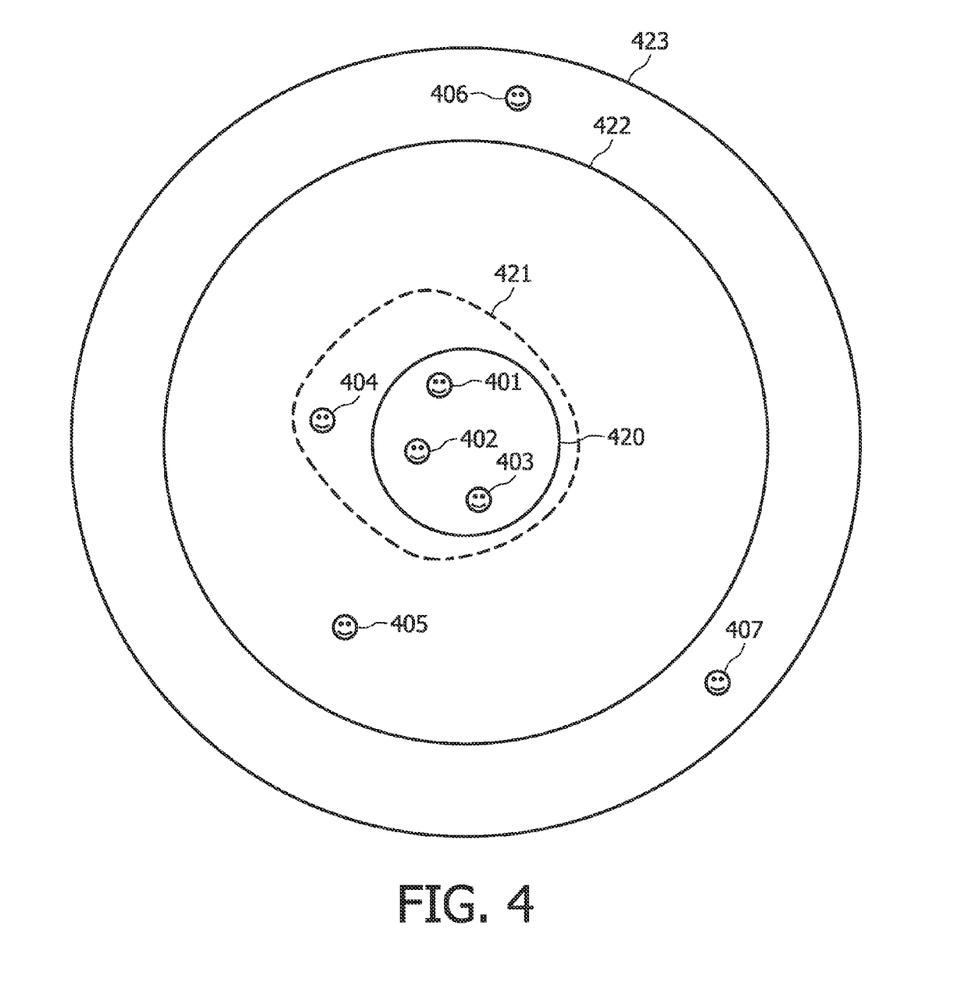
FIG. 4 illustrates social networks.

The inclusion strategy defines which users to include in this limited population. FIG. 4 depicts such process and illustrates an inclusion strategy that, e.g., gives preference to distant family over friends of co-workers of a user. That is, in FIG. 4 a user 401 is located at the centre of subsets of populations of persons, illustrated with boundaries 420, 421, 422 and 423. The outermost boundary 423 encloses a complete population of people, e.g. the total population of the world, including exemplifying persons 406 and 407, and the intermediate boundary 422 defines the complete social network of the user 401. The innermost boundary 420 encloses a group of persons that are associated with the user 401 according to a first degree relationship. For example, the group of persons inside the innermost boundary 420 comprises a parent 402 and a co-worker 403 of the user 401. The dashed boundary 421 encloses a limited social network of the user 401, the limitation being defined by one or more security parameters such as maximum number of persons and/or relations to the user 401. For example, an uncle 404 may be included in the limited social network defined by the boundary 421.

Continuing now with the flow chart in FIG. 3, the social network service is queried, in a query step 305, to determine a combined social network based on the one or more primary users and security parameters.

Determining the social network for a single primary user follows the outline of social network boundaries discussed above in connection with FIG. 4. In case the device 102 has multiple primary users, these users may be considered together, their combined first and higher degrees boundaries are determined, and then an inclusion strategy is applied to limit the number of persons to include in the group of persons from the social network.

Then, in a reception step 307, the social network service 106 provides the result of the determination of the group of persons of the limited social network to the device 102. Effectively, a list of user identifiers is provided and received in the reception step 307 by the device 102.

The device 102 then sends, in a request step 309, a request to the identity provider 108 to provide a list of biometric profiles for the group of persons of the limited social network identified and provided to the device in step 307. The list is received by the device 102 in a reception step 311.

In a matching step 313, the device 102 has both the biometric measurement it obtained in step 301, the list of user identifiers obtained in the reception step 307 and the list of biometric profiles corresponding to these persons obtained in reception step 311. A match is made of the biometric measurement obtained in step 301 with the received biometric profiles. On failure, biometric identification failed and it may offer the user a less convenient way to authenticate, e.g. manual input of a username/password. In case of a successful match, the device 102 selects appropriate user identifier and continues with a service login step 315.

In the service login step 315, the device 102 logs into the service of the service provider 104 for the identified user. How this precisely works with authentication is outside the scope of this description.

The method described above authenticates a user to an electronic device. Here the authorization is applied for enabling the user to access a service at a service provider. For this purpose biometric profiles are obtained and kept in memory in the device itself (cf. step 311), which in some situations and environments may be considered insecure and a privacy risk. This may be addressed in two ways as described below.

Instead of being performed in the device 102 itself, biometric verification, i.e. matching, may be performed at the identity provider 108. This obviates the need for the electronic device 102 to handle the actual biometric profiles, which offers better privacy. This alternative would change the procedure that takes place in steps 309-313 described above into steps that would involve transmitting the biometric measurement of the user to the identity provider 108 together with the information that specifies the group of persons of the limited social network of the primary user. The identity provider 108 then performs the matching of the biometric measurement with the biometric profiles of the persons in the limited social network, and provides the result of the matching, e.g. in the form of a user identifier, to the electronic device 102. A further variation of such an alternative would be to have the identity provider 108 to obtain, e.g. by utilizing a social networking service, the information that specifies the group of persons of the limited social network, based on received information that specifies the primary user.

Furthermore, the step of returning from the identity provider user identifier upon a successful matching may be enhanced by also returning, to the electronic device, an authentication assertion (e.g. by way of Security Assertion Markup Language, SAML) that states that the user was successfully authenticated using biometrics. The electronic device 102 may then use this assertion and present it to the service in the login step 315.

Template protection is another way to obviate the need for the electronic device 102 to store biometric profiles, which offers better privacy. Instead the electronic device 102 may store biometric helper data and secure biometric templates. This is advantageous since from the helper data and secure biometric templates it is not possible to reconstruct the original biometric profile. This alternative would change the procedure that takes place in steps 309-313 described above into steps that would involve, after having provided the information that specifies the group of persons of the limited social network of the user, receiving from the identity provider 108 helper data and secure biometric templates corresponding to the persons in the limited social network. The electronic device 102 would then use this information together with the biometric measurement obtained from the user in a template protection method by using all available helper data and verify if the result matches with the corresponding secure biometric template. In case of a success, the corresponding user identifier is selected and the process continues in the login step 315.

It is to be noted that the step of applying the template protection method has a complexity of N where N represents the number of people in the limited combined social network. Given that the template protection method is relatively light, this is deemed to be feasible for small numbers of N, e.g. in the order of 100. Calculation of features from the biometric measurement of the user is the most processing intensive step and this has only to be done once.

An alternative way of using the template protection method is to have the identity provider 108 to perform the verification. This alternative would change the procedure that takes place in steps 309-313 described above into steps that would involve, after having provided the information that specifies the limited social network of the user, receiving from the identity provider 108 helper data. The helper data would then be processed together with the biometric measurement of the user in a template protection method producing a respective template for all persons in the limited social network, which are then provided to the identity provider 108. These templates are then checked whether or not they match the corresponding secure biometric template and, on success, the appropriate user identifier is selected and provided to the electronic device 102. Also in this alternative way of utilizing templates, the identity provider 108 may return an authentication assertion (using SAML) for further use.

Hence, to summarize briefly, authentication of a user to an electronic device in a communication network is described herein. The method comprises obtaining a biometric characteristic of the user, transmitting, to a social networking service, information that specifies at least one primary user of the device, receiving, from the social networking service, information that specifies a group of persons who have a social relationship with the at least one primary user, obtaining information that specifies a result from a biometric matching operation with the biometric characteristic of the user and biometric characteristics of persons in the specified group of persons, the result indicating whether or not the user is authenticated to the electronic device. By narrowing down the size of the searching space needed during a matching operation by utilizing information regarding a group of persons in a social network, the false acceptance rate is reduced and biometric authentication of a user to an electronic device is thereby facilitated, e.g. to access desired functionality of the device or access a desired service.

The invention claimed is:

1. A method of authenticating a user to an electronic device in a communication network, comprising:
   obtaining a biometric characteristic of the user,
   transmitting, to a social networking service, information that specifies at least one primary user of the device,
   receiving, from the social networking service, information that specifies a group of persons who have a social relationship with the at least one primary user,
   obtaining information that specifies a result from a biometric matching operation with the biometric characteristic of the user and biometric characteristics of persons in the specified group of persons, the result indicating whether or not the user is authenticated to the electronic device.

2. The method of claim 1, wherein
   the transmission of information that specifies at least one primary user of the device comprises transmission of at least one limiting parameter for limiting the number of persons in the specified group of persons.

3. The method of claim 2, wherein the transmission of at least one limiting parameter comprises transmission of a number that specifies the maximum number of persons in the specified group of persons.

4. The method of claim 2, wherein the transmission of at least one limiting parameter comprises transmission of information that specifies types of relationships between the at least one primary user and persons in a social network of the user.

5. The method of claim 2, wherein the transmission of at least one limiting parameter comprises transmission of information that specifies at least one characteristic parameter relating to the performance of the device in obtaining the biometric characteristic of the user.

6. The method of claim 5, wherein the transmission of information that specifies at least one characteristic parameter relating to the performance of the device in obtaining the biometric characteristic of the user comprises transmission of information related to any of a false acceptance rate and a false rejection rate.

7. The method of claim 2, comprising determining, depending on the obtained information of the result of the biometric matching, whether or not the user is authenticated to access a user desired service 104).

8. The method of claim 7, wherein the transmission of at least one limiting parameter comprises transmission of at least one limiting parameter that is obtained from a provider of the desired service.

9. The method of claim 1, comprising:
   transmitting, to an identity provider, information of the specified group of persons,
   receiving, from the identity provider, biometric characteristics of the persons in the specified group of persons, and
   wherein the obtaining of information that specifies a result from a biometric matching operation comprises performing the matching operation.

10. The method of claim 9, wherein:
    the reception, from the identity provider, of biometric characteristics of persons in the social network comprises reception of secure biometric templates and helper data associated with the secure biometric templates, and
    the matching operation comprises utilizing the secure biometric templates and the helper data.

11. The method of claim 1, comprising:
    transmitting, to an identity provider, the biometric characteristic of the user and information of the specified group of persons, and wherein the obtaining of information that specifies a result from a biometric matching operation comprises:
    receiving information, from the identity provider, that specifies a result from a biometric matching operation with the biometric characteristic of the user and biometric characteristics of persons in the specified group of persons.

12. The method of claim 11, comprising:
    receiving, from the identity provider, helper data related to biometric templates that are associated with the persons in the specified group of persons,
    generating biometric templates using the helper data and the biometric characteristic of the user, and
    transmitting the generated biometric templates to the identity provider.

13. Electronic device comprising biometric input means, processing and communication circuitry that are configured to authenticating a user to the electronic device in a communication network, the circuitry being configured to:
    obtain a biometric characteristic of the user,
    transmit, to a social networking service, information that specifies at least one primary user of the device,
    receive, from the social networking service, information that specifies a group of persons who have a social relationship with the at least one primary user, and
    obtain information that specifies a result from a biometric matching operation with the biometric characteristic of the user and biometric characteristics of persons in the specified group of persons; the result indicating whether or not the user is authenticated to the electronic device.

14. A non-transitory computer readable media comprising software instructions that, when executed in a processing unit, performs a method of authenticating a user in relation to an electronic device in a communication network, the method comprising:
    obtaining a biometric characteristic of the user,
    transmitting, to a social networking service, information that specifies at least one primary user of the device,
    receiving, from the social networking service, information that specifies a group of persons who have a social relationship with the at least one primary user, and
    obtaining information that specifies a result from a biometric matching operation with the biometric characteristic of the user and biometric characteristics of persons in the specified group of persons, the result indicating whether or not the user is authenticated to the electronic device.

15. A method of enabling authentication of a user in a communication network, comprising:
- receiving information that specifies at least one primary user,
- receiving a biometric characteristic of the user,
- obtaining information that specifies a group of persons who have a social relationship with the at least one primary user, and
- performing a biometric matching operation with the biometric characteristic of the user and biometric characteristics or persons in the specified group of persons, the result indicating whether or not the user is authenticated.

16. Apparatus comprising processing and communication circuitry that are configured to enable authentication of a user in a communication network, the circuitry being configured to:
- receive information that specifies at least one primary user,
- receive a biometric characteristic of the user,
- obtain information that specifies a group of persons who have a social relationship with the at least one primary user, and
- perform a biometric matching operation with the biometric characteristic of the user and biometric characteristics of persons in the specified group of persons, the result indicating whether or not the user is authenticated.

17. A non-transitory computer readable media comprising software instructions that, when executed in a processing unit, performs a method of enabling authentication of a user in a communication network, the method comprising:
- receiving information that specifies at least one primary user,
- receiving a biometric characteristic of the user,
- obtaining information that specifies a group of persons who have a social relationship with the at least one primary user, and
- performing a biometric matching operation with the biometric characteristic of the user and biometric characteristics of persons in the specified group of persons, the result indicating whether or not the user is authenticated.

* * * * *